March 6, 1956

G. E. MULLINIX 2,736,941

PIPE SLIP MECHANISM

Filed Jan. 14, 1950

GIRD E. MULLINIX,
INVENTOR.

BY Lyon & Lyon

ATTORNEYS

March 6, 1956  G. E. MULLINIX  2,736,941
PIPE SLIP MECHANISM
Filed Jan. 14, 1950  6 Sheets-Sheet 4

GIRD E. MULLINIX,
INVENTOR.

BY Lyon & Lyon
ATTORNEYS

March 6, 1956  G. E. MULLINIX  2,736,941
PIPE SLIP MECHANISM
Filed Jan. 14, 1950  6 Sheets-Sheet 6

GIRD E. MULLINIX,
INVENTOR.

BY Lyon & Lyon
ATTORNEYS

United States Patent Office 2,736,941
Patented Mar. 6, 1956

2,736,941

PIPE SLIP MECHANISM

Gird E. Mullinix, South Gate, Calif., assignor, by mesne assignments, to Borg-Warner Corporation, Chicago, Ill., a corporation of Illinois Application January 14, 1950, Serial No. 138,588

12 Claims. (Cl. 24—263)

This invention relates to pipe handling devices. It is particularly directed to power operated pipe slip assemblies for use in supporting drill pipe and casing as employed in well drilling and completing operations.

In conventional well drilling and completion practice it is customary to support drill pipe by a rotary table when making up and breaking out the threaded joints between pipe sections. The pipe is supported by a plurality of wedge-shaped slips which seat within a tapered bowl provided by a master bushing carried in the rotary table. Each slip has a tapered outer surface conforming to the shape of the slip bowl and may be provided with a series of hardened inserts or dies on its inner surface for contact with the pipe. The slips may be raised and lowered individually or as a group, and the raising and lowering operation may be done by hand or by power operated devices.

For purposes of this description it may be pointed out that there are two general types of slip assemblies: (a) the non-connected type wherein each slip member is individually positioned and withdrawn from the slip bowl, and (b) the so-called "unitized" type wherein adjacent slip members are pivotally connected so that the assembly is raised and lowered as a unit. The term "unitized slip assembly" as employed in the following description and claims refers to a slip assembly employing a plurality of slip members pivotally interconnected to each other to prevent relative vertical movement between them and capable of being raised and lowered as a unit. A unitized slip assembly as thus defined insures that the individual slip members shall seat at the same elevation within the slip bowl. If non-connected independent slip members are set individually they may seat at varying elevation within the slip bowl. The likelihood of uneven seating is increased when the pipe is suspended off-center with respect to the bowl so that a slip member on one side of the pipe comes to rest within the bowl at an elevation considerably higher than a similar slip member on the other side of the pipe and within the bowl. In such case the wedge load is not properly distributed through surface contact of the slip members within the slip bowl, and objectionable concentration of stresses on the outer edges of the seating faces of the lower slips results. Reduction in bearing surface between the slip members and the bowl results in increased wear on both the slip members and inner surface of the bowl. Furthermore, the slip members may tend to stick within the bowl under such conditions and make removal therefrom difficult.

A unitized slip assembly, on the other hand, prevents seating of the slips at uneven elevations because no individual slip member can drop lower than any other slip member. Should the pipe hang off-center with respect to the bowl, one of the slips will engage the pipe initially and subsequent relative movement of the pipe to seat the slip assembly will cause the remaining slip members to be seated within the bowl and to support the pipe in a central position.

The use of power operated slip assemblies has been proposed in order to relieve the crew members of the drilling rig of the manual effort required in raising and lowering the slips each time a joint of pipe is connected or disconnected. The fatigue of the crew members resulting from manual operation of the slips not only slows down the drilling operation but may render the crew members less alert to danger.

Power operated slip assemblies heretofore proposed have utilized a plurality of non-connected slip members or slip assemblies each totaling less than 180° circumference, independently suspended from a like plurality of vertically movable actuating assemblies. Such as arrangement is subject to the various disadvantages pointed out above regarding a slip assembly made up of non-connected independent slip members. Additionally, a further disadvantage is introduced with the use of such a mechanism to support the pipe while disconnecting pipe joints by "spinning out." The operation of "spinning out" is accomplished by restraining an upper length of pipe from rotation while rotating the lower portion of the pipe string as it is suspended by the slip assembly in the rotary table. Should one slip member be set deeper in the bowl than the remaining slip members it will exert a greater downward force upon the rotatable portion of the vertical actuator at its point of attachment thereto, so that upon rotation of the rotary table considerable wobble of the rotatable portion of the slip actuator may be produced.

One of the principal objects of this invention is to provide a novel unitized slip assembly and power operated actuating mechanism therefor to move the slip assembly to and from an operative pipe supporting position within the slip bowl and an inoperative retracted position spaced laterally from the pipe. Hence, this invention embodies the advantages of a unitized slip assembly and also includes the advantages arising from the use of power as a means for moving the assembly to and from operative position.

Another object is to provide a power operated slip actuating assembly which acts through novel means to simulate the movement of a unitized slip assembly as operated manually by members of the drilling crew under conventional drilling practice.

Another object of this invention is to provide a power operated lift assembly for pipe slips including a slip carrier movable along an inclined path and supported from a lift ring whereby the slip assembly may move by gravity toward an inoperative retracted position at one side of the pipe, upon lifting of the slips out of the slip bowl.

Another object of this invention is to provide a power operated slip assembly actuating mechanism which may be swung laterally away from the pipe toward either side of the rotary table as desired when it is not in use. The location of various items of drilling equipment and machinery upon the derrick floor varies with different rigs and with different drilling practices. Therefore, the ability to move the power operated slip assembly and actuating mechanism to an inoperative position on either side of the rotary table is an important feature, and avoids taking of floor space needed for other drilling operations. A further important object of the invention is to provide a novel and improved unitized slip assembly, the advantages of which are not limited to use in a power mechanism but which is nevertheless admirably adapted for use as a subcombination of the power operated slip actuating structure herein set forth.

Other objects and advantages will be described more fully hereinafter.

Figure 6:
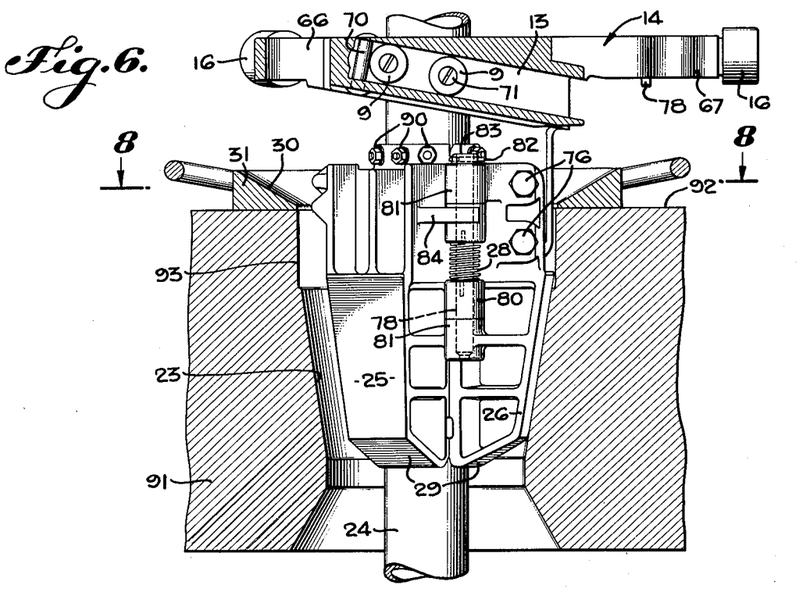
Figure 6 is a sectional elevation taken substantially on the lines 6—6 of Figure 3, the lifting ring being omitted for clarity of illustration.
Figure 7:
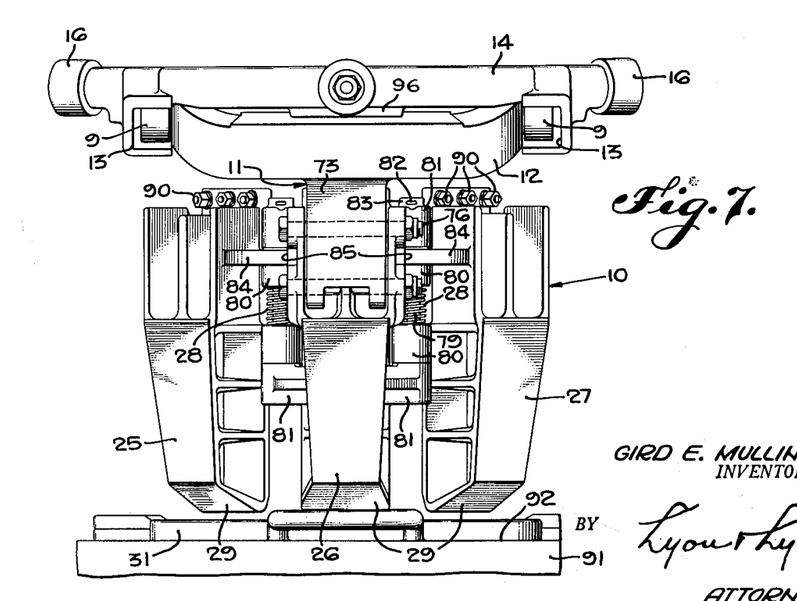
Figure 7 is a rear elevation showing the unitized slip assembly in retracted position, the lifting ring being omitted for clarity of illustration.

Referring to the drawings, my improved slip actuating mechanism comprises briefly a unitized slip assembly 10 suspended from a single arm 11 which extends downwardly from a yoke or carrier 12. The yoke 12 is provided with rollers 9 supported for movement within spaced parallel inclined trackways 13. The trackways are provided on a spider 14 which in turn is rotatably mounted with respect to the housing or lifting ring 15. The spider 14 is provided with three equally spaced supporting rollers 16 which roll in an annular groove 17 provided between the vertically spaced annular raceways 18 and 19 provided on the housing 15. A bracket 20 connects the lifting ring or housing 15 to the head 21 of the power unit generally designated 22. When the head 21 is raised under power the lifting ring 15 moves upwardly carrying the spider 14 with it. The yoke or carrier 12 is lifted by the spider 14, causing the arm 11 to raise the unitized slip assembly out of the slip bowl 23 provided within the master bushing 91 of rotary tube 8. When the unitized slip assembly has been raised out of the bowl 23 the yoke 12 gravitates down the inclined trackways 13 to move the slip assembly 10 laterally away from the pipe 24 to the position shown in Figure 4. Individual slip members 25, 26 and 27 making up the unitized slip assembly 10 swing open under action of torsion springs 28 after being withdrawn from the bowl 23 so that they assume the position shown in Figure 7 when retracted. Lowering of the ring 15 causes the lower inclined surfaces 29 on the slip members to engage the inclined surface 30 on the guide plate 31 affixed to the master bushing 91 so that the outer slip members 25 and 27 are caused to swing about the pipe 24 and the inner slip member 26 is caused to move radially inwardly. The carrier or yoke 12 moves relatively upwardly along the inclined trackways 13 as the ring 15 descends and the unitized slip assembly 10 enters the slip bowl 23 into pipe supporting position as shown in Figure 6.

Proceeding to a more detailed description of the various components and individual parts of the device embodying my invention, the rotary table 8 is supported on the framework of a derrick structure, and the power unit 22 is positioned in predetermined relationship to said rotary machine. The power unit is bolted to a sub-base 32 which in turn is bolted to a bracket 33 rigidly secured to one side of the base of the rotary table, as by welding. It will be understood that the derrick floor is built up around the rotary table and the power unit, but this has been omitted from the drawings in order to illustrate more clearly the power unit mounting. While for the purpose of the invention any type of power unit may be utilized which is capable of providing vertical actuation of the lifting ring 15, a preferred type of power unit is shown in the drawings, the construction of which is fully set forth in my co-pending application, Serial No. 138,589, filed January 14, 1950, now Patent No. 2,638,316, issued May 12, 1953. A second type of suitable power unit is shown in my co-pending application, Serial No. 660,679, filed April 9, 1946, now Patent No. 2,575,356, issued November 20, 1951.

The power unit shown is of the double-acting plunger type and includes a vertical plunger 34 projecting through the upper end of a housing 35. This plunger is normally keyed in non-rotatable relation to the housing but may be rendered rotatable thereto at such time as the slip actuating assembly is to be laterally applied to or removed from the pipe, as will be explained hereinafter. The upper end of the plunger carries the head member 21 having a laterally extending mounting flange 36. The downwardly sloping support arm 20 forms a rigid connection between the head member 21 and the lifting ring 15. The support arm 20 is preferably an integral casting formed with a first end wall 37 which is bolted to the mounting flange 36 of head member 21 and a second end wall 38 which is bolted to one end of the lifting ring 15. The bottom of arm 20 is open whereby access is afforded to the mounting bolts 39.

An adjustable stop bolt 40 is threaded into the bottom portion of the head member 21 and is provided with a lock nut 41. The head 42 of said stop bolt is adapted to abut a rubber bumper 43 secured to the upper surface of the housing 35 to limit the downward movement of the head 21.

Figure 2:
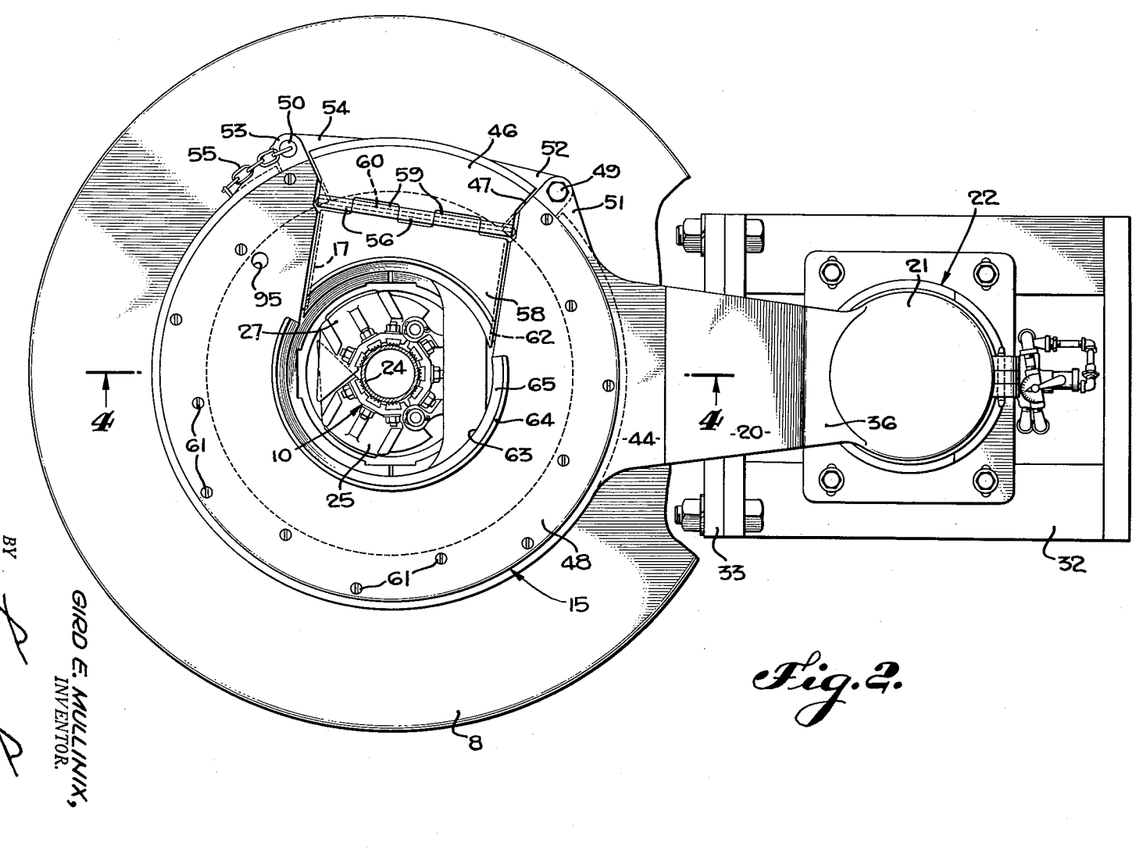
Figure 2 is a top plan view.
Figure 3:
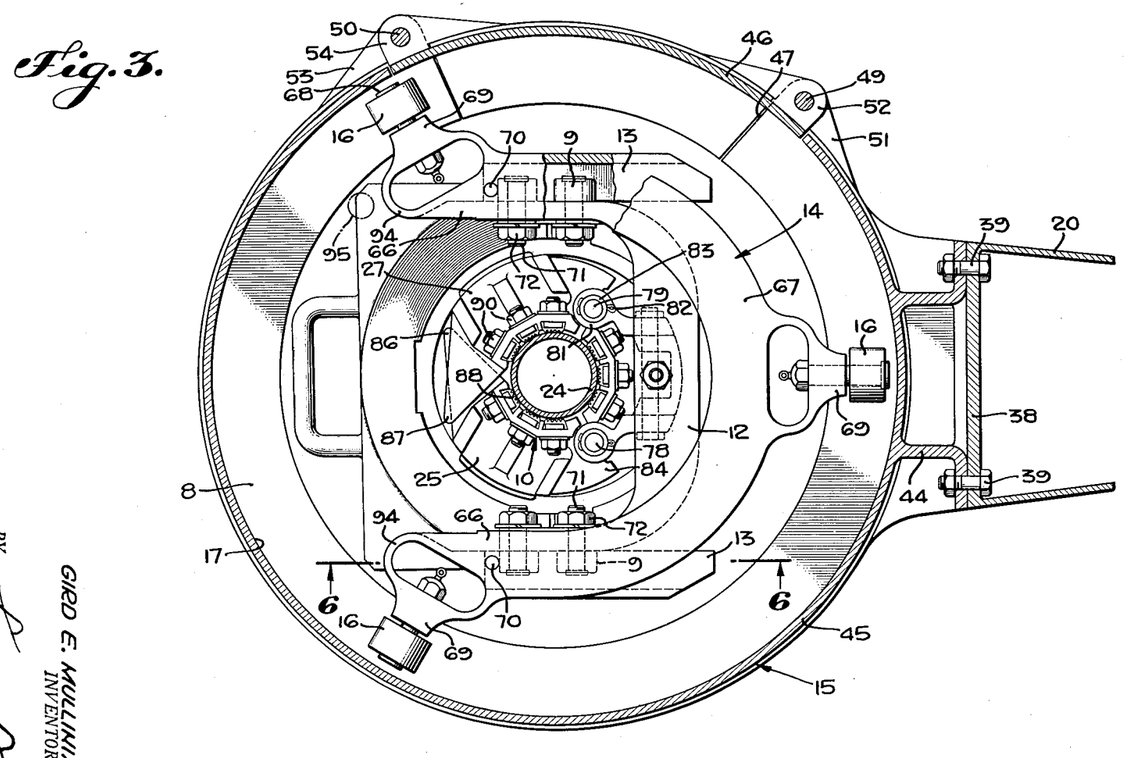
Figure 3 is a sectional plan view partly broken away taken substantially on the lines 3—3 as shown in Figure 1.

Referring now to Figures 2 and 3, it will be seen that the lifting ring 15 is of generally annular configuration in plan view except for a short laterally extending mounting boss 44 formed at one side, and comprises a main body 45, a gate 46 received in a lateral opening 47 formed in said main body and constituting a pivoted or detachable segment of the main body, and a cover 48. Together the main body and the gate, which are preferably of cast construction, define the spaced pair of annular raceways 18 and 19.

The gate 46 is secured to the main body 45 by pins 49 and 50. Pin 49 is insertable through aligned openings in spaced body lugs 51 and gate lug 52. Similarly, pin 50 is insertable through aligned openings in body lugs 53 and gate lug 54. A short chain 55 is anchored at one of its ends to the main body and at its other end it is secured to the pin 50. Pins 49 and 50 are readily removable whereby the gate 46 may be pivoted open about either pin, or completely detached from the main body by the removal of both pins. With reference to Figure 2, it will be noted that the upper portion of the gate 46 extends inwardly and is provided with three inwardly extending hinge lugs 56.

The gate section 58 of the cover 48 is provided with interfitting lugs 59 and a horizontal pivot pin 60 extends through apertures in the lugs to pivotally connect the gate section 58 to the gate 46. Bolts 61 secure the cover 48 to the ring 15. The gate section 58 is supported in a horizontal position by lateral extensions 62 of the main body cover 48.

The cover 48 is provided with a central opening 63 which is sufficiently large to permit unobstructed vertical movement therethrough of the well pipe, including the tool joints thereof as well as the rubber casing protector collars generally affixed to sections of the pipe. An upstanding flange 64 is formed adjacent the periphery of the opening, which flange serves to stiffen the cover at this point. The inner face 65 of this flange is flared whereby downward moving well pipe will be deflected toward the center of the opening should the lower edge of a tool joint or casing protector collar of said pipe strike said flange.

The spider 14 is disposed within the lifting ring 15.

The spider 14 is generally U-shaped in plan view, having spaced parallel arms 66 and a semi-circular portion 67 interconnecting said arms. Non-rotary pins 68 are fixed to bosses 69 on the spider 14, and the rollers 16 are rotatably mounted on the pins 68. The rollers 16 rotatably support the spider 14 upon the ring 15. In profile it will be seen that both of said arms 66 are formed to define downwardly sloping grooves forming trackways 13. Pins 70 extend across the upper end of the grooves forming the trackways.

Operatively connected to the spider member 14 by means of two pair of rollers 9 disposed within trackways 13 of said spider is the yoke or slip carrier member 12. This yoke has two pairs of bores formed therein for reception of roller shafts 71 which are secured to said yoke by nuts 72. The integral slip assembly attachment arm 11 depends from the mid-portion of the yoke 12, which arm includes a back wall 73 and opposed side walls 74. Upper and lower pairs of aligned bores 75 are formed in the side walls to receive detachable slip assembly attachment pins 76.

Figure 1:
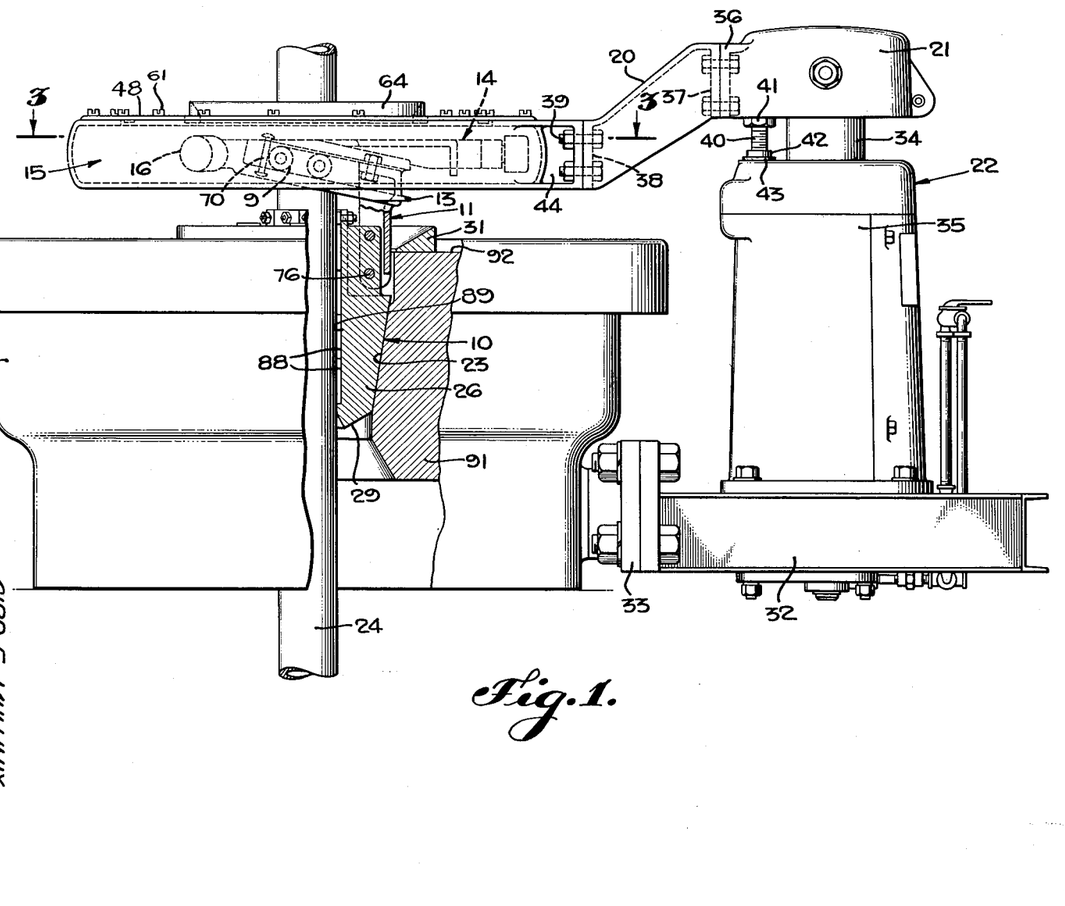
Figure 1 is a side elevation partly broken away showing a preferred embodiment of my invention, the unitized slip assembly being in operative pipe supporting position.
Figures 4, 5:
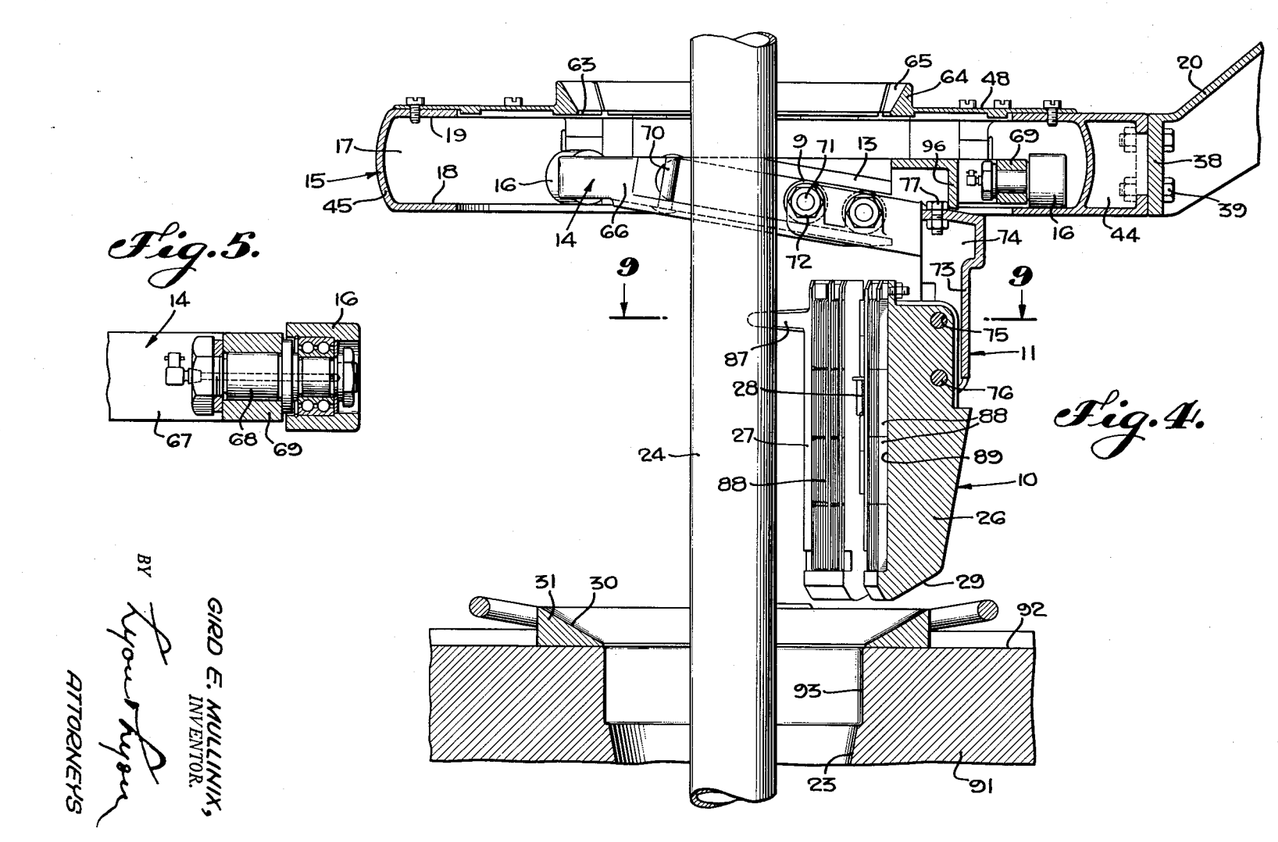
Figure 4 is a sectional elevation taken substantially on the lines 4—4 as shown in Figure 2 and illustrating the unitized slip assembly in retracted position after being lifted from the slip bowl.
Figure 5 is a sectional detail showing the mounting and construction of one of the supporting rollers for the spider.

The yoke 12 is adapted to be moved laterally with respect to the spider 14, the two pairs of rollers 9 being free to travel in the sloping trackways 13 of said spider within an upper limit determined by the engagement of the upper rollers 9 with the stop pins 70 as shown in Figure 1, and a lower limit determined by the engagement of a stop bolt 77 with a depending flange 96 of the spider 14 as shown in Figure 4. The bolt 77 may be removed whereby the yoke is detachable from the spider 14, said rollers 9 then being free to move through the lower open end of the trackway.

The slip assembly generally designated 10 is of unitized construction comprising a center slip member 26 having vertical ribs wherein are formed two pairs of aligned bores for reception of attachment pins 76. The assembly is thus detachably connected to the depending arm 11 of yoke 12. A pair of side slip members 25 and 27 are pivotally connected to either side of the center slip member by vertical pins 78 and 79, respectively.

The preferred construction of slip assembly is illustrated in detail in Figures 4 and 6 to 9 inclusive, and with reference to these figures it will be seen that the pins 78 and 79 are headless and are retained within vertical bores formed in lugs 80 of each side slip member and aligned bores of lugs 81 of the center slip member 26 by cotter pins 82. Cotter pins 82 extend through the upper portion of each of the pins and through upstanding projections 83 of each of the side slips. The spiral torsion springs 28 encircle the pins 78 and 79 and are positioned between lugs 80, which springs are substantially identical and are so biased as to constantly exert an opening force on the side slip members 25 and 27 with respect to the center slip member 26. The outward pivotal movement of the slide slip members resulting from such spring force is limited by a laterally extending finger 84 formed on each side slip member and having a flat surface which is adapted to abut the side of the center slip member at 85. It should be further noted that the free ends of the side slip bodies or slip members are formed with integral wings 86 and 87, which wings overlap at such time as the slip assembly is closed about the pipe. These wings are adapted to facilitate the closing of the slip assembly 10 about the pipe 24 and the manner whereby this is accomplished will be set forth hereinafter. The pipe-engaging inserts or dies 88 are mounted in the inner faces of the slip bodies within vertical grooves 89 and are retained therein by bolt and nut combinations 90.

When the lifting ring 15 is gradually raised, the three rollers 16 of the spider member 14 will be engaged in the groove 17 to raise the spider 14. The upward motion of the spider 14 is in turn transferred to the yoke 12 by virtue of its connection thereto by the two pairs of rollers 9, and accordingly said yoke 12 and its attached slip assembly 10 are also raised with respect to the rotary table. As the slip assembly is lifted from the slip bowl 23 the side slip bodies 25 and 27, due to the opening force exerted by the torsion springs 28, will gradually swing outwardly away from the pipe 24 as the diameter of the bowl 23 increases, until such time as the bottom of the slip assembly 10 clears the upper surface of the rotary table, whereupon said side slip bodies 25 and 27 will be urged outwardly to the extent permitted by fingers 84. It should be especially noted that as the slip assembly 10 is raised it gradually moves laterally away from the longitudinal axis of the pipe, said movement resulting from the action of the rollers 9 in rolling down the inclined trackways 13 under the weight of the yoke 12 and the slip assembly suspended therefrom. When the bottom of the slip assembly 10 clears the top of the rotary table, said rollers 9 are free to travel to the position of Figure 4, at which time the slip assembly 10 is fully retracted with respect to the pipe 24.

It is recognized that the rollers could be carried on the spider and the trackway provided on the yoke 12 without departing from the spirit of the invention.

It should be noted that in order to enable the slip assembly 10 to be retracted a sufficient distance to clear any size pipe or collar thereon which can pass through a standard master bushing, said slip assembly must be raised completely above the top of the master bushing 91, as shown in Figure 4. A standard master bushing is provided with a flat upper surface 92, and hence it is necessary to provide means for initially guiding the lower ends of the slip bodies inwardly at such time as the slip assembly 10 is lowered into pipe-supporting position in order to prevent their "hanging up" on the flat upper surface 92 of the master bushing 91. For this purpose the two-piece guide plate 31 is positioned on the master bushing 91 and properly centered by the Kelly bushing square recess 93 in the master bushing. The upper surface 30 of the guide plate is tapered downwardly and inwardly at a small angle of the order of thirty degrees to provide a sloping surface down which the lower ends of the slip bodies will ride as the lifting ring 15 is initially lowered.

In order to lower the slip assembly 10 into pipe-supporting position within the slip bowl 23 the power unit 22 is actuated so as to produce a down stroke. Normally during the initial downward movement of the lifting ring 15 the weight of the slip assembly 10 causes said assembly to fall freely with respect to the lifting ring until such time as the bottom surfaces 29 of the slip bodies engage the tapered surface 30 of the guide plate 31. At such time the downward travel of the slip assembly 10 will be slowed and the upper annular raceway 19 of the lifting ring 15 will then engage the three spider rollers 16. The downward movement of the lifting ring 15 is thereafter transferred directly to the spider through rollers 16 and also to the yoke 12 and to the slip assembly because of the engagement of the top of the rollers 9 with the upper guide surface of the trackways 13.

The tapered surface 30 of the guide plate 31 is preferably coated with a lubricating medium and, inasmuch as the bottom surfaces 29 of the slips are beveled at an angle approximating that of said surface, the rapidly descending slip bodies will be thrown toward the pipe 24 with considerable force when their bottom surfaces strike said surface. Accordingly, the central slip body or slip member 26 will be thrown laterally toward the pipe while the two side slip bodies 25 and 27 are pivoted inwardly at considerable speed toward said pipe. As these side slip bodies are swung toward the pipe the inner faces of the wings 86 and 87 formed on said slip bodies will engage the pipe 24 and exert thereon inward pressure, which pressure tends to close the slip bodies about the pipe. Should it occur that the pipe 24 is suspended off-center toward one side of the slip bowl 23, the spider 14 may be manually rotated within the lifting ring 15 each time before the said ring is lowered, preferably into a position wherein the center slip body 26 is disposed at the side of the bowl 23 toward which the pipe 24 is offset.

While the individual slip bodies are being moved laterally to encompass the pipe, the slip assembly 10 is being lowered as a unit into the slip bowl 23 until eventually the slip bodies become wedged between the bowl 23 and the pipe 24. At this time the downward movement of the slip assembly 10 and the yoke 12 is arrested. Upon continued downward movement of the lifting ring 15, the spider 14, from which the slip assembly has been suspended, comes to rest supported on the yoke 12 by engagement of the trackways 13 with the rollers 9. Further descent of the lifting ring 15 is limited, as by means of the adjustable stop bolt 40 mounted on the head member 21, to a short distance in order to dispose the spider rollers 16 approximately midway between the upper and lower raceways 18 and 19 of the lifting ring 15. Because of the downward inclination of the trackways 13 the spider 14 tends to shift laterally to the right, as viewed in Figure 1, when supported on the rollers 9, but such movement is restrained by engagement of the left-hand roller of each pair with pins 70.

There is a decided advantage in maintaining the spider rollers 16 free of contact with the lifting ring 15 at such time as the rotary table is used to spin out pipe joints. As set forth briefly above, in this operation the lower section of pipe is supported in the rotary table master bushing by the slip assembly while the upper section of pipe is suspended by the derrick hoisting means. A first pipe tong is applied to the lower section to maintain it against rotation while a second pipe tong is applied to the upper section and actuated so as to initially break out the joint between the two pipe sections. The first tong is then removed and the rotary table rotated in a clockwise direction so as to spin out the remaining threads of the pipe joint. Inasmuch as the rotating elements of the device of the present invention do not contact the stationary elements thereof during this operation, no wear will take place between these elements.

When the device is to be moved laterally away from its operative position, the lifting ring 15 is raised to its upper position and the spider 14 rotated by hand so the opening between ends of the side arms 66 will be aligned with the gate opening 47. At this time one of the loops 94 formed on the spider 14 will be positioned below a hole 95 formed in the cover of the lifting ring. Next, the gate pin 50 is removed to permit the gate to be pivoted outwardly about the other gate pin 49. The gate pin 50 may then be dropped into the hole 95 whereby the spider 14 will be locked against rotation relative to the lifting ring 15. Accordingly, the spider 14 cannot fall out of the lifting ring through the uncovered gate opening 47 while the gate 46 is open. Additionally, inasmuch as the gate pin 50 must be removed from its spider-locking position hole 95 in order to return it to its gate-securing position, the danger that the slip assembly 10 might be rotated while the spider is still locked is eliminated.

After the gate 46 has been swung open the lifting ring 15 and arm 20 may be swung laterally about the vertical axis of the power unit 22 in a counterclockwise direction as viewed in Figure 2, it being noted that the center of the gate opening 47 lies on an arc drawn through the axis of the pipe from the vertical axis of the plunger 34. The lifting ring 15 and its depending members are swung laterally until said ring reaches an inoperative storage position preferably 180 degrees from from that shown in Figure 2. When the device is again to be applied to the pipe, the reverse of the aforedescribed operation is performed.

On certain rigs the disposition of drilling equipment on the derrick floor may be such that the device must be swung in clockwise direction rather than counterclockwise direction, to its inoperative position. Accordingly, the device is provided with means enabling it to be readily adapted to be swung into and out of operating position in either clockwise or counterclockwise direction. It is contemplated that the lifting ring be of symmetrical construction whereby it may be reversibly attached to the support arm 20 so as to dispose the gate opening 47 selectively on either side of said ring. The preferred specific embodiment of this feature is shown in Figures 1 to 4 inclusive, wherein the lifting ring is seen to be symmetrical with respect to a horizontal plane positioned midway between the top and bottom surfaces of said ring whereby it may be inverted with respect to the support arm 20. In order to so invert the lifting ring 15, the cover 48, the gate 46 and the spider 14 with its attached members should first be removed therefrom. The spider is removable from the lifting ring after the gate is opened by rotating said spider to a position where one of its three rollers 16 will fall through the gate opening 47, whereupon said spider may be tilted for lateral outward movement from said ring. Next, the mounting bolts 39 are removed, the lifting ring inverted with respect to the support arm 20, and said bolts replaced. The gate 46 may then be re-attached to the lifting ring 15, it being understood that the gate opening 47 now lies on the opposite side of said ring from that shown in Figures 1 to 4. Next, the cover 48 is secured to the upturned bottom surface of the lifting ring by means of attachment bolts 61. Finally, the spider 14 and its attached members are replaced in the lifting ring 15 and the device is again ready for operation.

Figures 8, 9, 10:
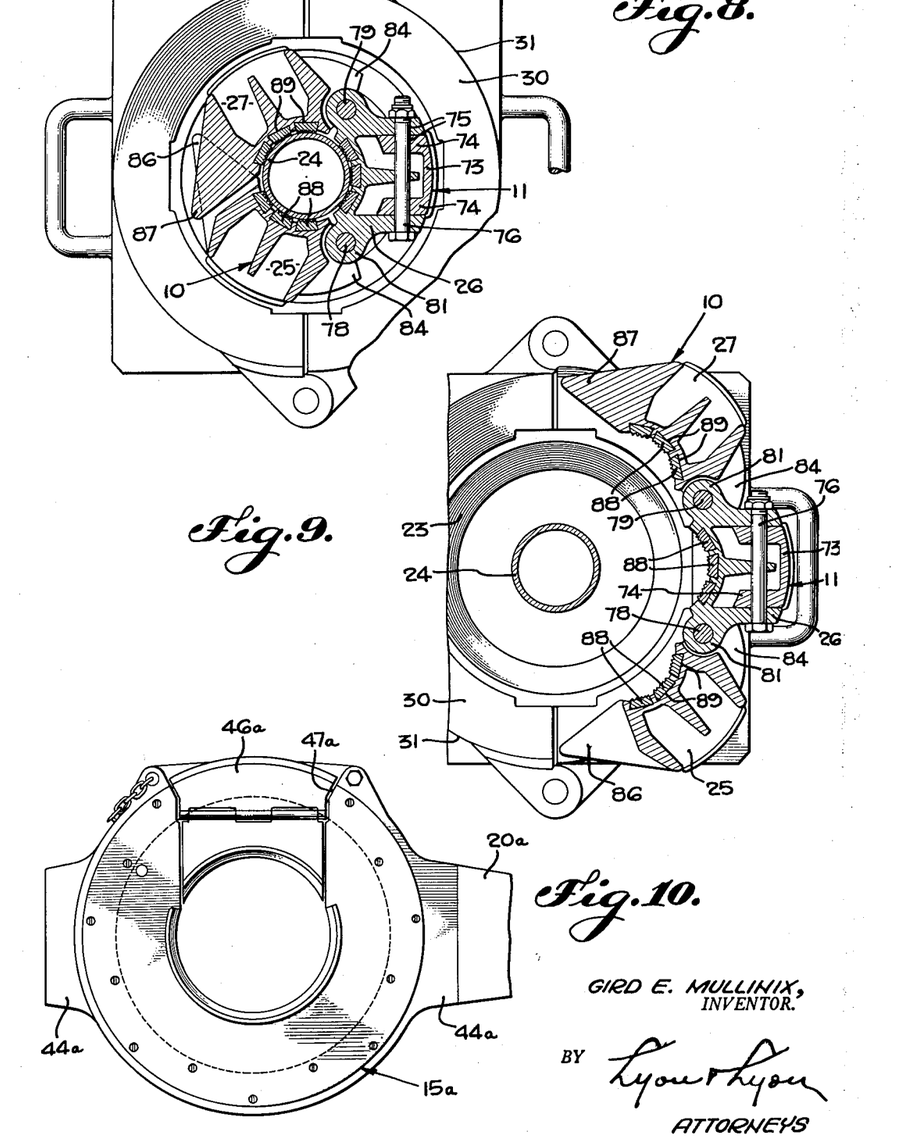
Figure 8 is a sectional plan view partly broken away and taken substantially on the lines 8—8 as shown in Figure 6.
Figure 9 is a sectional plan view partly broken away taken substantially on the lines 9—9 as shown in Figure 4.
Figure 10 is a plan view on a reduced scale showing a modified form of lifting ring for a unitized slip assembly.

An alternate construction of the lifting ring is shown in Figure 10 wherein said ring 15a is seen to be symmetrical with respect to a vertical axial plane extended through the gate opening 47a. In this embodiment the lifting ring has formed thereon at diametrically opposite sides thereof, two identical mounting sections in the form of bosses 44a whereby the gate 46a may be disposed at either side of the ring by securing either of the bosses 44a to the support arm 20a. With this embodiment it is desirable to provide a wider gate opening 47a than with the preferred embodiment, inasmuch as the center of said opening must lie on a central transverse plane of the lifting ring rather than on an arc formed with the center of the plunger as a center. The reason for this change should become evident when it is pointed out that at such time as the modified lifting ring 15a is rotated 180 degrees from its position in Figure 10, the gate opening 47a will be disposed diametrically opposite its original location. When a lifting ring of the alternate construction of Figure 10 is utilized it should be noted that it is not necesasry to remove the gate, cover and spider therefrom while reversing the position of said ring with respect to the support arm.

It will be apparent from the foregoing description of one embodiment of the invention and a modification thereof that it possesses the practical advantages of simplicity, ruggedness and dependability under the severe operating conditions to which a device of this type is subjected. By providing an opening in the lifting ring cover at least as large as the diameter of the slip bowl, and by providing for sufficient set-back of the slip bodies or slip members to clear these openings, it is possible to handle pipe of any size up to the maximum size which can be run through a standard master bushing. The single attachment point between the yoke 12 and the slip assembly 10 reduces to a minimum the time required to change to a different size slip assembly 10. The ready adaptability of the lifting ring for horizontal swiveling in either direction with respect to the rotary table provides a simple arrangement for moving said ring and the parts supported thereby into an inoperative position wholly clear of the table despite the particular disposition of the other drilling equipment on the derrick floor. The use of the same pin for alternately locking the spider against rotation and securing the gate prevents accidental damage to said spider which might be occasioned by causing it to rotate before it is unlocked. Other advantages inherent in the device will be apparent to those familiar with deep well drilling operation.

Having fully described my invention, it is to be understood that I do not wish to be limited to the details herein set forth, but my invention is of the full scope of the appended claims.

I claim:

1. In a selectively operable device for use with a slip bowl to support a well pipe, the combination of a unitized slip assembly adapted to seat within the bowl and encompass a well pipe, a rotatable member supported independently of the slip bowl for movement axially of the pipe, and for rotation therearound, a carrier member, cooperating parts including a trackway on one member located at one side of the pipe, the longitudinal axis of said trackway being laterally spaced from and non-radial to said well pipe, and rollers on the other member for supporting and guiding the carrier member on the first said member for movement laterally of the rotary axis of said first member, and a support element connecting the unitized slip assembly to said carrier member only and at a side thereof which is movable radially away from said pipe.

2. In a selectively operable device for use with a slip bowl to support a well pipe, the combination of a unitized slip assembly adapted to seat within the bowl and to encompass a well pipe, a lifting ring encircling the pipe and means mounting said ring for axial movement with respect to said pipe, a member rotatably supported upon the ring for rotation around said pipe, a carrier member, cooperating parts including laterally spaced and laterally extending inclined trackways on one member and rollers on the other for supporting and guiding the carrier member for movement laterally on the first said member, and a support element connecting the unitized slip assembly to said carrier member only and at a side thereof which is movable radially away from said pipe.

3. In a selectively operable device for use with a slip bowl to support a well pipe, the combination of a unitized assembly of wedge-shaped pipe-supporting slip bodies pivotally connected along adjacent edges and adapted to seat within the bowl and cooperating to encompass a well pipe, springs on said assembly biased to move the slip bodies about their pivotal connections in a direction opposite to their pipe-encompassing movement, a lifting ring encircling the pipe and mounted for axial movement with respect thereto, a spider member rotatably supported upon the ring for rotation around said pipe, a carrier member, cooperating parts including lateral trackways on one member and rollers on the other supporting the carrier member for lateral movement on the spider member, and a support element connecting one of the slip bodies to the carrier only and at a side thereof which is movable radially away from said pipe.

4. A device for actuating a well pipe slip assembly comprising a substantially horizontally disposed lifting ring adapted to encompass the pipe when the device is in operative position, said ring being formed with a lateral opening whereby it may be laterally applied to or removed from the pipe, a gate normally closing said opening, said ring and said gate being formed with recesses adapted to be aligned when said gate is in a closed position, a locking member insertable in said aligned recesses to maintain said gate in a closed position, and an open-sided slip assembly supporting frame rotatably carried by said lifting ring, said frame and said ring having locking recesses adapted to be aligned upon rotation of said frame to align the open side thereof with said lateral opening, said locking member being selectively insertable in the first mentioned aligned recesses to maintain said gate in closed position or alternately in the aligned locking recesses to lock said frame against rotation relative to said ring while said gate is open.

5. A device for actuating a well pipe slip assembly comprising a substantially horizontally disposed lifting ring adapted to encompass the pipe when the device is in operative position, said ring being formed with a lateral opening and a closure therefor whereby the ring may be laterally applied to or removed from the pipe, said ring having means on its periphery, arcuately spaced from said lateral opening an amount of the order of 90° for fixedly securing said ring to a vertically reciprocal actuator, and said ring being of a construction whereby it may be reversibly attached to said actuator so as to dispose said opening selectively on either side of said well pipe, and a support structure rotatably carried by said ring and securable to said slip assembly.

6. A device for actuating a well pipe slip assembly comprising a substantially horizontally disposed lifting ring adapted to encompass the pipe when the device is in operative position, said ring being formed with a lateral opening and a closure therefor whereby the ring may be laterally applied to or removed from the pipe, said ring having means on its periphery, arcuately spaced from said lateral opening an amount of the order of 90°, for fixedly securing said ring to a vertically reciprocal actuator, and said ring being substantially symmetrical with respect to a central horizontal plane extended therethrough whereby it may be inverted so as to dispose said opening selectively on either side of said well pipe, and a support structure rotatably carried by said ring and securable to said slip assembly.

7. A device for actuating a well pipe slip assembly comprising a substantially horizontally disposed lifting ring adapted to encompass the pipe when the device is in operative position, said ring being formed with a lateral opening and a closure therefor whereby the ring may be laterally applied to or removed from the pipe, said ring having mounting sections at diametrically opposite sides thereof, said sections being selectively securable to a vertically reciprocal actuator, and said ring being substantially symmetrical with respect to a vertical axial plane extended through the center of said opening whereby upon rotation of said ring about its central vertical axis either mounting section may be selectively attached to said actuator so as to dispose said opening selectively on either side of said ring, and a support structure rotatably carried by said ring and securable to said slip assembly.

8. In a pipe engaging slip assembly characterized by a plurality of hinged pipe engaging elements, including side elements, hingedly secured together along parallel axes and movable to and from pipe encircling position; the combination therewith of extending camming parts formed on the free edges of said side elements to engage a pipe as the elements are being applied thereto for exerting inward pressure thereon to center the pipe with respect to said elements whereby said elements may close about said pipe with said camming parts in overlapping arrangement, said elements having end surfaces oblique to said hinge axes.

9. In a pipe slip actuator for inserting and removing pipe engaging slips from the bowl of a rotary table the combination of: means mounted independently of the bowl for pivotal movement laterally away from said bowl and for movement axially of said bowl; a lifting ring carried by said means and movable laterally therewith to and from a coaxial position with respect to said bowl, and movable axially of said bowl; an opening in said ring permitting its encirclement of a pipe mounted in said bowl; a circular groove in said ring; a rotatable spider mounted within said ring engaging said groove, said spider having an opening therein registerable with the opening of said ring; laterally extending trackways on opposite sides of said spider; a yoke mounted on said trackways for movement thereof along said trackways laterally of the axis of said ring; a unitized slip assembly for encircling a pipe in said bowl, including a central slip and a pair of cooperating side slips hingedly secured one on each side of said central slip and supported thereby; and means for securing only said central slip to said yoke at a side thereof which is movable radially away from said pipe.

10. In a pipe slip actuator for inserting and removing pipe engaging slips from the bowl of a rotary table the combination of: means mounted independently of the bowl for pivotal movement laterally away from said bowl and for movement axially of said bowl; a lifting ring carried by said means and movable therewith to and from a coaxial position with respect to said bowl, and movable axially of said bowl; an opening in said ring permitting its encirclement of a pipe mounted in said bowl; a circular groove in said ring; a rotatable spider mounted within said ring engaging said groove to be rotatably supported within said member, said spider having an opening therein registerable with the opening of said ring; laterally extending trackways on opposite sides of said spider; a substantially U-shaped yoke having its arms respectively mounted on said trackways for lateral movement thereof along said trackways laterally of the axis of said spider; a unitized slip assembly for encircling a pipe in said bowl, including a central slip, a pair of cooperating side slips hingedly secured one on each side of said central slip and supported thereby, and spring means biasing said slips toward open extended position with respect to said central slip; and means for securing only said central slip to said yoke at a side thereof which is movable radially away from said pipe.

11. In a pipe slip actuator for inserting and removing pipe engaging slips from the bowl of a rotary table the combination of: means mounted independently of the bowl for pivotal movement and movement axially of said bowl; a lifting ring carried by said means and movable therewith to and from a coaxial position with respect to said bowl and axially of said bowl; an opening in said ring permitting its encirclement of a pipe mounted through said bowl; a circular groove in said ring; a rotatable spider mounted within said ring having anti-friction means engaging said groove to rotatably support said spider within said ring, said spider having an opening therein registrable with the opening of said ring to permit encirclement and removal of said spider with said ring with respect to a pipe mounted in said bowl; a pair of substantially parallel inclined trackways rigidly secured to said spider; a substantially U-shaped yoke including anti-friction means mounted on said trackway to permit lateral movement of said yoke with respect to the axis of said spider; a unitized slip assembly for encircling a pipe in said bowl, including a central slip; and means for securing said central slip to said yoke.

12. In a pipe slip actuator for inserting and removing pipe engaging slips from the bowl of a rotary table the combination of: means mounted independently of the bowl for pivotal movement and movement axially thereof with respect to said bowl; a lifting ring carried by said means and movable therewith to and from a coaxial position with respect to said bowl and axially of said bowl; an opening in said ring permitting its encirclement of a pipe mounted through said bowl and a gate for closing said opening; a circular groove in said ring; a rotatable spider mounted within said ring and having anti-friction means engaging said groove to rotatably support said spider within said ring, said spider having an opening therein registrable with the opening of said ring to permit encirclement and removal of said spider with said ring with respect to a pipe mounted in said bowl; a pair of substantially parallel inclined trackways rigidly secured to said spider; a substantially U-shaped yoke including anti-friction means mounted on said trackways to permit lateral movement of said yoke with respect to the axis of said spider; a unitized slip assembly for encircling a pipe in said bowl, including a central slip, a pair of cooperating side slips hingedly secured one on each side of said central slip, spring means biasing said slips toward open extended position with respect to said central slip, and interengageable wings on the outer edges of said cooperating side slips co-engageable upon inward pivotal movement of said slips to pipe encircling position; and means for securing said central slip to said yoke.

References Cited in the file of this patent

UNITED STATES PATENTS

| | | |
|---|---|---|
| 612,793 | Weiss | Oct. 18, 1898 |
| 1,341,702 | Black | June 1, 1920 |
| 1,460,402 | Benckenstein | July 3, 1923 |
| 1,614,581 | Wright | Jan. 18, 1927 |
| 1,656,864 | Martin | Jan. 17, 1928 |
| 1,716,905 | Smith | June 11, 1929 |
| 1,733,010 | Green | Oct. 22, 1929 |
| 1,753,543 | Wilson et al. | Apr. 8, 1930 |
| 1,878,372 | Box | Sept. 20, 1932 |
| 1,904,256 | Sheldon | Apr. 18, 1933 |
| 1,930,790 | Dick | Oct. 17, 1933 |
| 1,986,284 | Penick et al. | Jan. 1, 1935 |
| 2,063,378 | Hiniker | Dec. 8, 1936 |
| 2,068,217 | Abegg | Jan. 19, 1937 |
| 2,093,788 | Vaughn | Sept. 21, 1937 |
| 2,126,933 | Stone et al. | Aug. 16, 1938 |
| 2,231,923 | Koen | Feb. 18, 1941 |
| 2,245,979 | Johnson | June 17, 1941 |
| 2,340,597 | Kelley | Feb. 1, 1944 |
| 2,354,217 | Mullinix et al. | July 25, 1944 |
| 2,426,099 | Hershowitz | Aug. 19, 1947 |
| 2,527,954 | Nixon | Oct. 31, 1950 |
| 2,545,627 | Moore | Mar. 20, 1951 |
| 2,575,649 | Abegg | Nov. 20, 1951 |
| 2,607,098 | Wilson | Aug. 19, 1952 |
| 2,636,241 | Liljestrand | Apr. 28, 1953 |